United States Patent
Swiderski (10) Patent No.: US 11,421,644 B2
(45) Date of Patent: Aug. 23, 2022

(54) SELF-REGULATING WATER TURBINE SUB-RUNNER, AND A WATER TURBINE EQUIPPED WITH SELF-REGULATING WATER TURBINE SUB-RUNNER

(71) Applicant: COMPOSITE HYDRAULIC TURBINE OTTAWA INC., Ottawa (CA)

(72) Inventor: Jacek Swiderski, Ottawa (CA)

(73) Assignee: COMPOSITE HYDRAULIC TURBINE OTTAWA INC., Ottawa (CA)

(*) Notice: Subject to any disclaimer, the term of this patent is extended or adjusted under 35 U.S.C. 154(b) by 413 days.

(21) Appl. No.: 16/487,943

(22) PCT Filed: Feb. 23, 2018

(86) PCT No.: PCT/CA2018/050208
§ 371 (c)(1),
(2) Date: Aug. 22, 2019

(87) PCT Pub. No.: WO2018/152639
PCT Pub. Date: Aug. 30, 2018

(65) Prior Publication Data
US 2019/0383259 A1 Dec. 19, 2019

Related U.S. Application Data

(60) Provisional application No. 62/463,344, filed on Feb. 24, 2017.

(51) Int. Cl.
*F03B 3/14* (2006.01)
*F03B 3/06* (2006.01)
*F03B 15/00* (2006.01)

(52) U.S. Cl.
CPC .............. *F03B 3/145* (2013.01); *F03B 3/06* (2013.01); *F03B 15/00* (2013.01)

(58) Field of Classification Search
CPC .... F03B 3/145; F03B 3/14; F03B 3/06; F03B 15/00; F03B 15/06; F03B 15/08;
(Continued)

(56) References Cited

U.S. PATENT DOCUMENTS 1,399,059 A 12/1921 Kaplan
1,611,341 A 12/1926 Deriaz
(Continued)

FOREIGN PATENT DOCUMENTS

WO 2013029909 A1 3/2013

*Primary Examiner* — Justin D Seabe
*Assistant Examiner* — Eric A Lange
(74) *Attorney, Agent, or Firm* — The Webb Law Firm (57) ABSTRACT

The present invention provides a turbine sub-runner that is positioned to be within the vortex zone of a turbine main runner. The sub-runner includes at least two sub-runner blades, configured to monitor the relative flow of the vortex created by the main runner. A sub-runner hub will be positioned downstream of the main runner blades. A sub-runner shaft, having a threaded section, will also be a part of the sub-runner, and will be connected to the sub-runner hub housing adjustable sub-runner blades and the mechanism enabling to regulate angular position of sub-runner blades. A main runner blades control mechanism will be connected to the sub-runner shaft via threaded interface, and is capable of transferring the rotational energy of the sub-runner into angular movement of the main runner blades. As the sub-runner interacts with the changing conditions of the main runner vortex, it will act to automatically regulate, adjust, and control the angle of the main runner blades to optimize the performance of the turbine. The sub-runner uses the energy of the sub-runner blades to perform the monitoring,
(Continued)

regulation, adjustment and control of the main runner through regulating angular position of main runner blades.

6 Claims, 6 Drawing Sheets

(58) Field of Classification Search
CPC .......... F03B 15/10; F03B 15/18; F03B 3/123; F05B 2260/70; F05B 2260/71; F05B 2260/74; F05B 2260/75; F05B 2260/78; F05B 2260/79; F05B 2230/80; Y02E 10/20
See application file for complete search history.

(56) References Cited

U.S. PATENT DOCUMENTS

| | | | |
|---|---|---|---|
| 1,907,466 A | 5/1933 | Terry et al. | |
| 1,931,158 A * | 10/1933 | Biggs | F03B 3/145 415/23 |
| 3,187,189 A | 6/1965 | Lang et al. | |
| 6,533,536 B1 * | 3/2003 | Fisher, Jr | F03B 11/006 415/17 |
| 2014/0210207 A1 | 7/2014 | Chir | |
| 2016/0169031 A1 * | 6/2016 | Kets | B64C 11/346 416/147 |

* cited by examiner

SELF-REGULATING WATER TURBINE SUB-RUNNER, AND A WATER TURBINE EQUIPPED WITH SELF-REGULATING WATER TURBINE SUB-RUNNER

CROSS-REFERENCE TO RELATED APPLICATIONS

This application is the United States national phase of International Application No. PCT/CA2018/050208 filed Feb. 23, 2018, and claims priority to United States Provisional Patent Application No. 62/463,344 filed Feb. 24, 2017, the disclosures of which are hereby incorporated by reference in their entirety.

FIELD

The present invention pertains to the field of water turbine electrical power generation and in particular to water turbine control and performance optimization.

BACKGROUND

Electricity can be generated by running flowing water through a turbine. This hydroelectric power may then be diverted into the general power grid to be consumed by an electricity consumer. Turbine design has undergone several improvements since its original inception in order to improve the efficiency of turbine electricity generation.

Water turbines produce electricity when the potential and kinetic energy of moving water is converted into mechanical energy. Water may be diverted from a lake or river, and permitted to enter a turbine through wicket gates. Wicket gates are able to open and close in order to control the amount of water that enters the turbine. The wicket gates may be controlled externally and have their orientation altered to suit the water conditions in which the turbine is operating. After water enters the turbine through the wicket gates it passes over the main runner, which consists of main runner blades and a main runner hub. The main runner blades can be controlled in order to suit the water conditions in which the turbine is operating. For example, the main runner blade angles may be adjusted in order to optimize the performance of the turbine. When the water runs over the main runner blades, the kinetic energy of the water is converted into mechanical energy as the main runner blades rotate in response to the running water. As the main runner blades rotate, they in turn cause a main runner shaft to rotate. This main runner shaft is connected to a generator, which converts the rotational energy from the shaft into electrical energy. After the water has passed over the main runner blades, it exits the turbine out of a draft tube.

Double-regulated or regulated water turbines include a main runner equipped with adjustable main runner blades. The main runner blade angle is adjustable using an external controlling device, in response to the amount of water flowing through the wicket gate openings. These adjustable main runner blades extend turbine operating range from use at 70%-100% of the full load (in case of regulated wicket gates only), to an operating range of 20%-100% of full load (when regulation by adjustable runner blades is added). This improvement is due to a correlation (called a "cam table") between the main runner blade angle and the wicket gate openings, which was established based on model and field testing. Optimal turbine performance is achieved when the relative position of wicket gates and main runner blades follow the positions as defined within corresponding cam table. The process of controlling the blade and gate position is performed by mechanical or hydraulic coupling that is controlled by an external device, requiring power from an external energy source.

Water flow through the turbine can be measured and analyzed to provide data about the turbine and energy production efficiency. For example, analysis of water flow patterns leaving the main runner may carry information that can be used to maximize efficiency of the turbine.

An adjustable blade propeller water turbine was invented by Victor Kaplan and patented in 1912, called Kaplan turbine. The adjustable blade mixed-flow turbine was invented by Paul Deriaz and patented in 1926, called Deriaz turbine.

An attempt to develop a self-regulating Kaplan turbine was made in 1932 by R. V. Terry, and patented in 1932. This unit executed an adjustment of the runner blades to best suit operating conditions based on the differential pressure between the draft tube and the inlet casing. The piston was mounted inside the rotating runner hub and was connected through the links to adjust the runner blade angle. The whole idea was based on an assumption that the differential pressure between the inlet casing and the draft tube carries information on how to adjust the runner blades to optimize turbine efficiency, as well as providing the energy to execute movement of runner blades. The effectiveness of this method is not known, and it is not commonly used.

Therefore there is a need for turbine that provides for self-regulation of the main runner blades responsive to operating conditions as determined by measuring water flow information. There is a further need for a turbine that operates without the need of an external energy to perform regulation of the main runner blades, which is able to automatically alter the angle of the main runner blades to optimize the performance of the turbine.

This background information is provided to reveal information believed by the applicant to be of possible relevance to the present turbine sub-runner. No admission is necessarily intended, nor should be construed, that any of the preceding information constitutes prior art against the present turbine sub-runner.

BRIEF SUMMARY

An object of the present invention is to provide a self-regulating water turbine sub-runner for Kaplan or Deriaz type water turbines. In accordance with an aspect of the present invention, there is provided a turbine sub-runner for location within the vortex zone of a turbine main runner, the turbine sub-runner comprising: a sub-runner shaft operatively connected to the sub-runner control mechanism; a sub-runner hub connected to the sub-runner shaft; at least two sub-runner blades connected to the sub-runner hub; and a sub-runner control mechanism, capable of transferring the rotational energy of the sub-runner into angular movement of main runner blades of a turbine and the sub-runner blades; wherein the sub-runner is configured to be responsive to the relative flow of the vortex located downstream of a turbine main runner, created by the turbine main runner.

In accordance with another aspect of the present invention, there is provided a Kaplan or Deriaz type turbine encompassing a main runner comprising: at least two main runner blades; a main runner hub, connected to the at least two main runner blades and a main runner shaft; a main runner shaft connected to the at least two main runner blades and to a turbine power generator component; a turbine power generator component; and a sub-runner comprising:

at least two sub-runner blades, positioned below the turbine main runner and configured to interact with the relative flow of the vortex of a turbine main runner; a sub-runner hub positioned below the at least two sub-runner blades, connected to the at least two sub-runner blades and a sub-runner shaft; a sub-runner shaft connected to the sub-runner hub having at least two sub-runner blades and to a sub-runner control mechanism; and a sub-runner control mechanism, capable of transferring the rotational energy of the sub-runner into angular movement of the at least two main runner blades and the at least two sub-runner blades.

In accordance with another aspect of the present invention, there is provided a kit to retrofit a Kaplan or Deriaz type turbine with a turbine sub-runner comprising a turbine sub-runner for location within the vortex zone of a turbine main runner, the turbine sub-runner comprising: a sub-runner shaft operatively connected to the sub-runner control mechanism; a sub-runner hub connected to the sub-runner shaft; at least two sub-runner blades connected to the sub-runner hub; and a sub-runner control mechanism, capable of transferring the rotational energy of the sub-runner into angular movement of main runner blades of a turbine and the sub-runner blades; wherein the sub-runner is configured to be responsive to the relative flow of the vortex located downstream of a turbine main runner, created by the turbine main runner.

BRIEF DESCRIPTION OF THE FIGURES

Embodiments of the present invention will be better understood in connection with the following Figures, in which.

DETAILED DESCRIPTION

Turbine Sub-Runner Overview

The present invention provides a turbine sub-runner comprised of at least two sub-runner blades, a sub-runner hub, a sub-runner shaft, and a sub-runner control mechanism. The sub-runner is positioned to be within the vortex zone of a turbine main runner. The at least two sub-runner blades are configured to respond to the relative flow of the vortex created by the main runner. The sub-runner hub will be positioned below and connected to the sub-runner blades. The sub-runner shaft will be operatively connected to the sub-runner blades and sub-runner hub. The sub-runner control mechanism will be operatively connected to the sub-runner shaft, and is capable of transferring the rotational energy of the sub-runner blades and sub-runner shaft into angular movement of the main runner blades. As the sub-runner responds to the changing conditions of the main runner vortex, it will act to automatically regulate, adjust, and control the angle of the main runner blades to optimize the performance of the turbine. The sub-runner uses the energy of the sub-runner blades to perform the monitoring, regulation, adjustment and control of the main runner.

In one embodiment, the water flow behavior at the area located close to the turbine axis around the end of the main runner hub, also referred to herein as the main runner vortex, or "MRV", may be analyzed. The MRV leaving the main runner has a very specific and systematic behavior depending on the proximity to the ideal operating point at a given turbine load. If the main runner blades are positioned at too small of an angle, the MRV as observed in a non-rotating frame of reference has a tendency to rotate in the same direction as the main runner. If the main runner blade opening is too large, the MRV rotates in the opposite direction to the main runner blades and its intensity increases as the main runner blade opening increases.

In another embodiment, during a classical water turbine operation where the turbine speed remains constant, the MRV is also affected by the flow rate through the turbine depending on the position of wicket gates. When the flow rate is higher than optimal, the MRV has tendency to rotate in the direction opposite to the rotation of the runner. In the situation when the flow rate is too low, the flow has tendency to rotate in the same direction as the main runner. When those conditions are transposed to a rotating frame of reference (observer associated with the main runner) main velocity vector will be taking positions as shown on FIG. 2. The blades of a sub-runner may be designed in such a shape that their interaction with the optimal MRV creates mechanical torque equal zero on the sub-runner. In this configuration, when there is excessive water flow (the MRV rotates in a direction opposite to the Omega1) the hydraulic forces acting upon the sub-runner blades will tend to rotate sub-runner in an opposite direction that the Omega1. In the situation when the water flow is too low (the MRV rotates in the same direction as the Omega 1), hydraulic forces acting upon the sub-runner blades will tend to rotate sub-runner in the same direction as the Omega1. When the direction of rotation of the sub-runner changes its relative rotation, the main runner is used to adjust blades to either "more open" (during excessive water flow conditions) or "more closed" (in low water flow circumstances).

In one embodiment, the MRV characteristics imposed upon the sub-runner may be used to adjust the main runner blade angle in order to maximize turbine efficiency. A sub-runner installed in the zone of the MRV, may be responsive to the relative MVR which propels sub-runner blades. The sub-runner blades will in turn drive a sub-runner control mechanism which will adjust the position main runner blades to the point where the relative MRV diminishes. As the flow pattern surrounding the sub-runner (the MRV) diminishes, this flow character corresponds directly to more efficient turbine operation.

In one embodiment, the sub-runner will automatically adjust the position of the main runner blades. The sub-runner blades are propelled by the energy of the MVR—as described herein the MVR characteristics provide information related to the efficiency of the turbine. The propulsion of the sub-runner blades directly drives the sub-runner control mechanism, which proportionally controls the position of the main runner blades. As the characteristics of the MRV change, the propulsion of the sub-runner blades and in turn the action of the sub-runner control mechanism will modify in direct proportion to the MRV characteristics. In this way the main runner blades are automatically controlled by the characteristics of the MRV as imposed upon the sub-runner, without the need for a secondary control source to perform main runner blade regulation.

In one embodiment, the sub-runner will perform action such as but not limited to adjustment, control, regulation, alteration, modification, monitoring, or otherwise as understood by someone skilled in the art, on the main runner blades. This action may but is not limited to, altering the angle of the main runner blades.

In one embodiment, the wicket gates of the turbine may be controlled automatically, by a turbine operator, or otherwise as would be understood by someone skilled in the art. The position of the wicket gates may be altered to suit changing conditions of the water source being used to drive the turbine. For example, a long period of heavy rain may dramatically increase the source water flow—the wicket gates may be adjusted to account for the changing character of the turbine water source.

In one embodiment, when the wicket gates of a turbine are adjusted, the flow of water through the turbine will also change. The new water flow character through the turbine will impact the character of the MRV. The sub-runner is able to react to ongoing changes of the MRV and adjust the main runner blades accordingly to optimize turbine performance. In this way the sub-runner is able to maintain turbine optimization by perform ongoing adjustment (iterative adjustment) of the main runner blades, as a result of changes to the water flow through the turbine caused by wicket gate alteration.

In one embodiment, the sub-runner will adjust the position of the main runner blades using only the energy of the MVR. When the sub-runner blades are propelled by the energy of the MVR, they will transfer that energy to the sub-runner shaft, and onto the sub-runner control mechanism, which will use the same transferred energy to adjust the main runner blades. In this way the main runner blades will be adjusted without the need for a separate external energy source to perform main runner blade regulation.

In one embodiment, the automatic regulation, adjustment, and control by the sub-runner of the main runner blades, and the sub-runner use of the MRV energy to perform such regulation, adjustment, and control may be used in combination with a secondary regulation, monitoring or control mechanism. This configuration may act to provide a backup system for regulation, monitoring, adjustment, control, or otherwise as would be understood by someone skilled in the art, of the main runner blades.

In one embodiment, the automatic regulation, adjustment, and control by the sub-runner of the main runner blades, and the sub-runner use of the MRV energy to perform such regulation, adjustment, and control may act to increase the range of water flow (or load) for which a turbine may operate.

In one embodiment, the sub-runner and main runner will rotate independently of one another.

In one embodiment, the sub-runner may be installed on the main runner of a turbine during the turbine manufacturing or installation. In another embodiment, the sub-runner may be installed on the main runner of a turbine already in use in the field. In this way an existing turbine may be retrofitted to improve turbine performance.

In one embodiment, the sub-runner may be used to react to and control the main runner of a wind turbine in the same way that it monitors and controls the main runner of a water turbine.

In another embodiment, depending on the general operating range of the turbine and its nominal speed, the location of the sub-runner may vary. It may be between 0.1 and 0.6 of the main runner throat diameter ("Dth") measured from the centre of the main hub to the centre of the hub of the sub-runner. The diameter of the sub-runner varies for the same reason and may be between 0.3 to 0.6 of the Dth. The size and the location of the sub-runner is optimized so it operates within the MRV zone.

Sub-Runner Blades

In one embodiment, the turbine sub-runner will use two sub-runner blades, configured to react to the relative flow of the MRV of a turbine main runner. In another embodiment, the turbine sub-runner will use more than two sub-runner blades.

In one embodiment, the sub-runner blades will be made of low density, strong, corrosion resistant materials such as but not limited to carbon steel, austenitic stainless steel, martensitic stainless steel, other stainless steel alloys, steel alloys, chromium alloys, other alloys, metal, or otherwise as would be understood by someone skilled in the art.

In one embodiment, the shape of the sub-runner blades will be configured to capture the energy of the MRV as would be understood by someone skilled in the art.

In one embodiment, characteristics of the MVR, such as the direction of the MRV flow (as defined from the main runner's frame of reference) accurately indicates whether the main runner blade angles are too large or too small, when determining if the turbine is operating at optimum conditions. The sub-runner blades are able to monitor characteristics of the MVR, such as the direction of the MRV flow, to provide information to the sub-runner. This information can be related to the main runner blade angles and thus the turbine operating conditions.

In one embodiment, the sub-runner will have sub-runner blades adjustable to follow its optimal set-up angle depending on the actual position of the main runner blades. The optimal set-up angle of sub-runner blades is such that when main runner operates at its highest efficiency the sub-runner tends to spin with the same speed as the main runner (Omega1=Omega2). When the sub-runner blade angles are set in this configuration, any deviation from this optimum operation of the turbine will cause a flow interference with the sub-runner blades, producing mechanical torque on the sub-runner shaft.

Sub-Runner Hub

In one embodiment, the sub-runner will have a sub-runner hub positioned below the sub-runner blades. The sub-runner hub will be connected to, and act to facilitate the rotation of the sub-runner blades and the sub-runner shaft. The sub-runner hub houses adjustable blades (sub-runner blades) as well as the mechanism to regulate them. The bearings used within the sub-runner hub include traditional, self-lubricating bearings, or other appropriate bearings as would be understood by someone skilled in the art.

In one embodiment, the sub-runner hub will be made of low density, strong, corrosion resistant materials such as but not limited to carbon steel, austenitic stainless steel, martensitic stainless steel, other stainless steel alloys, steel alloys, chromium alloys, other alloys, metal, or otherwise as would be understood by someone skilled in the art.

Sub-Runner Shaft

In one embodiment, the sub-runner will have a sub-runner shaft. The sub-runner shaft may have a threaded section that helps to translate the rotation of the sub-runner into the linear movement of the main runner cross-head, which adjusts the main runner blades. The sub-runner shaft is connected to the sub-runner hub which houses the sub-runner blades and the sub-runner blade control mechanism.

The sub-runner shaft will also act to transfer the rotational energy of the sub-runner blades to the sub-runner control mechanism.

In one embodiment, the sub-runner shaft will be made of low density, strong, corrosion resistant materials such as but not limited to carbon steel, austenitic stainless steel, martensitic stainless steel, other stainless steel alloys, steel alloys, chromium alloys, other alloys, metal, or otherwise as would be understood by someone skilled in the art.

In one embodiment, the sub-runner shaft may be configured and positioned to be within the main runner shaft. In another embodiment, the sub-runner shaft may be configured and positioned to enclose the main runner shaft within. In another embodiment, the sub-runner shaft may be configured and positioned to be offset to the main runner shaft. In each of the contemplated configurations, the sub-runner shaft and main runner shaft will operate independently, and the operation of each shaft will be unaffected by their configuration.

In another embodiment, the configuration of the sub-runner shaft and the main runner hub is such that the sub-runner shaft is aided by a set of axial-lateral bearings within the main runner hub to allow the main runner and the sub-runner to spin with different speeds, while the axial relative position is fixed.

Sub-Runner Control Mechanism

In one embodiment, the sub-runner will have a sub-runner control mechanism, capable of transferring the rotational energy of the sub-runner blades into angular movement of the sub-runner blades as well as the main runner blades.

In another embodiment the sub-runner control mechanism will translate the rotational velocity of the sub-runner to a rotation of the main runner blades in order to change their pitch. The mechanism to execute this is a combination of a threaded rod, cross-head and the lever arm. The rotation of the threaded rod resulting from relative rotational velocity between the main runner and the sub-runner (Omega1-Omega2) acting through the threaded interface upon the cross-head changes the linear position of the cross-head that drives main-blades' lever arm up, or down thus changing angular position of the runner blade. As the cross-head of the main runner is coupled via axial bearings with the cross-head of the sub-runner, it allows for relative rotation between both cross-heads, and the linear movement of both is the same. The cross-head of the sub-runner is connected kinematically with the lever arms of the blades of the sub-runner, which imposes an angular movement of the sub-runner blades.

In an additional embodiment, the sub-runner control mechanism may transfer the rotational energy of the sub-runner blades into movement that repositions the main runner blades as would be understood by someone skilled in the art.

In another embodiment, the sub-runner control mechanism may reposition another component of the turbine as would be understood by someone skilled in the art. This repositioning may be based on the information the sub-runner control mechanism receives from the sub-runner monitoring of the MRV.

In another embodiment, the sub-runner control mechanism may transfer the rotational energy of the sub-runner blades into movement that repositions another component of the turbine as would be understood by someone skilled in the art.

In one embodiment, the sub-runner torque can be observed for any configuration of the sub-runner blades. The value of the sub-runner torque will depend on the shape of the blades used in the sub-runner, their location within the MRV, and the number of blades. Once these factors have been considered, the sub-runner can be designed to create sub-runner torque in the direction that coincides with the direction in which the main runner blade angle needs to be adjusted in order to optimize the turbine's efficiency. The sub-runner control mechanism may then use the sub-runner torque to adjust and control the main runner blade.

In one embodiment, the MRV carries energy which can be used to propel the sub-runner control mechanism. The characteristics of the MRV (such as but not limited to the rotational direction of the MRV), and the MRV energy may propel the sub-runner control mechanism so that it proportionally adjusts the main runner blades, creating a sub-runner feedback system. The sub-runner control mechanism may adjust the angle of the main runner blades to an angle that optimizes turbine performance, in relation to the water flow over the main runner blades. This sub-runner feedback system allows the sub-runner control mechanism to monitor and control the main runner blades in real time. The sub-runner feed-back system also allows the sub-runner control mechanism to monitor and control the main runner blades automatically, without the need for a secondary monitoring and control system.

In one embodiment, the sub-runner control mechanism may be used in combination with another turbine control system such as but not limited to mechanical governors, or electrical governors, digital governors, wicket gate controls, other turbine component controls, or otherwise as would be understood by someone skilled in the art. The sub-runner control mechanism may act in conjunction with another turbine control system to further refine the turbine control.

The turbine sub-runner will now be described with reference to specific examples. It will be understood that the following examples are intended to describe embodiments of the turbine sub-runner and are not intended to limit the turbine sub-runner in any way.

Examples

Figure 1A:
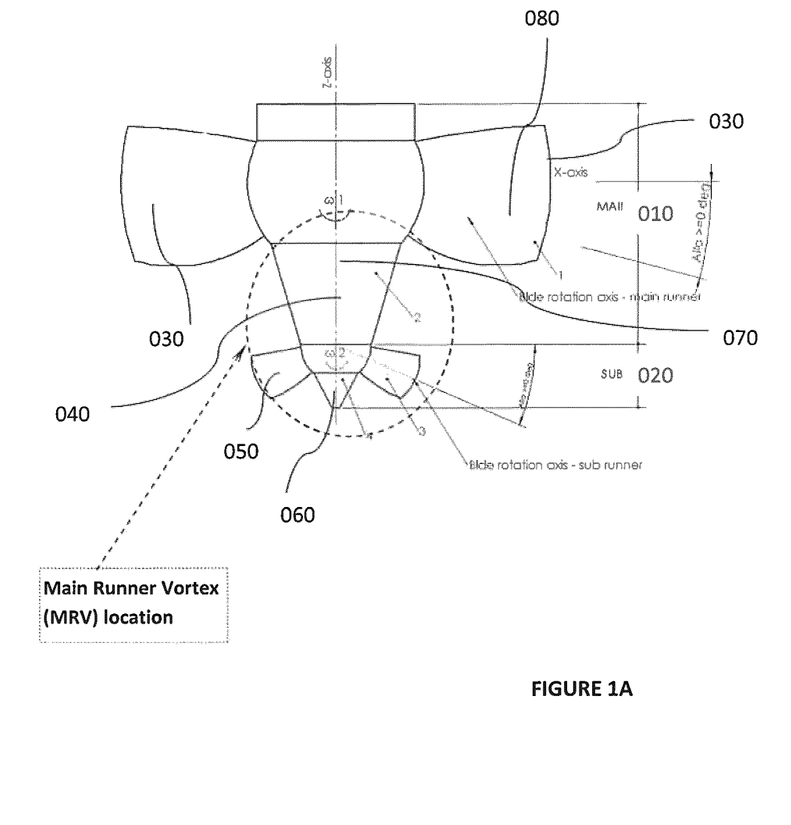
FIG. 1A illustrates a general arrangement of a Kaplan-type turbine main runner equipped with a sub-runner.
Figure 1B:
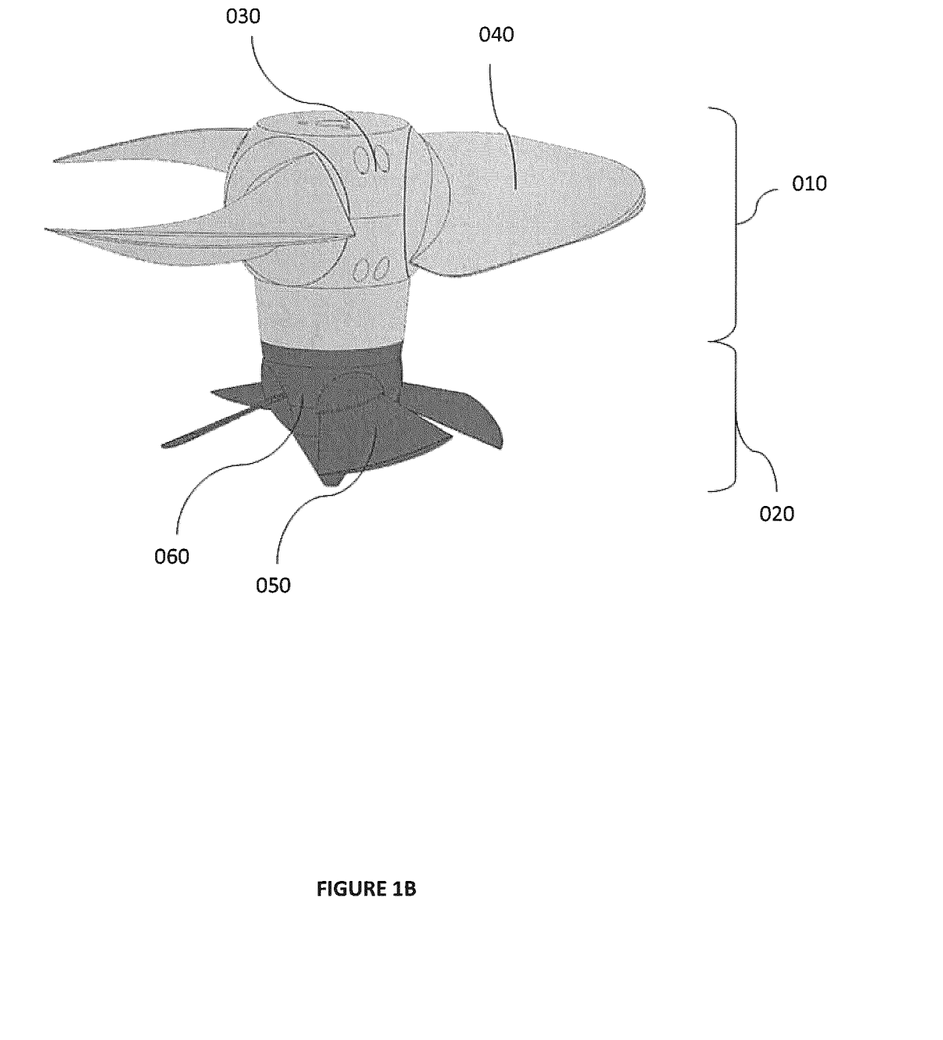
FIG. 1B also illustrates a general arrangement of a Kaplan-type turbine main runner equipped with a sub-runner

In one embodiment as depicted in FIG. 1A and FIG. 1B, the main runner 010 of a turbine is equipped with a sub-runner 020. The main runner has main runner blades 030 aligned along an x-axis 080, and rotating with a nominal speed ω1 (Omega1) around the z-axis 070. A main runner hub 040 is located below the main runner blades, which may also rotate around the x-axis to adjust the blade position for optimum turbine performance in relation to a given load. The sub-runner has sub-runner blades 050 rotating with a nominal speed ω2 (Omega2) around the z-axis. A sub-runner hub 060 is located below the sub-runner blades. The main runner blades and main runner hub rotate at the same speed as turbine nominal speed ω1 ($\omega1=\pi*n/30$, where n, in rotations per minute [rpm], is the nominal speed of the main runner shaft about the z-axis. The sub-runner blades and sub-runner hub rotate about the z-axis with a speed ω2 relative to the nominal speed ω1, depending on the relative flow of the MRV acting upon the sub runner blades.

Figure 2:
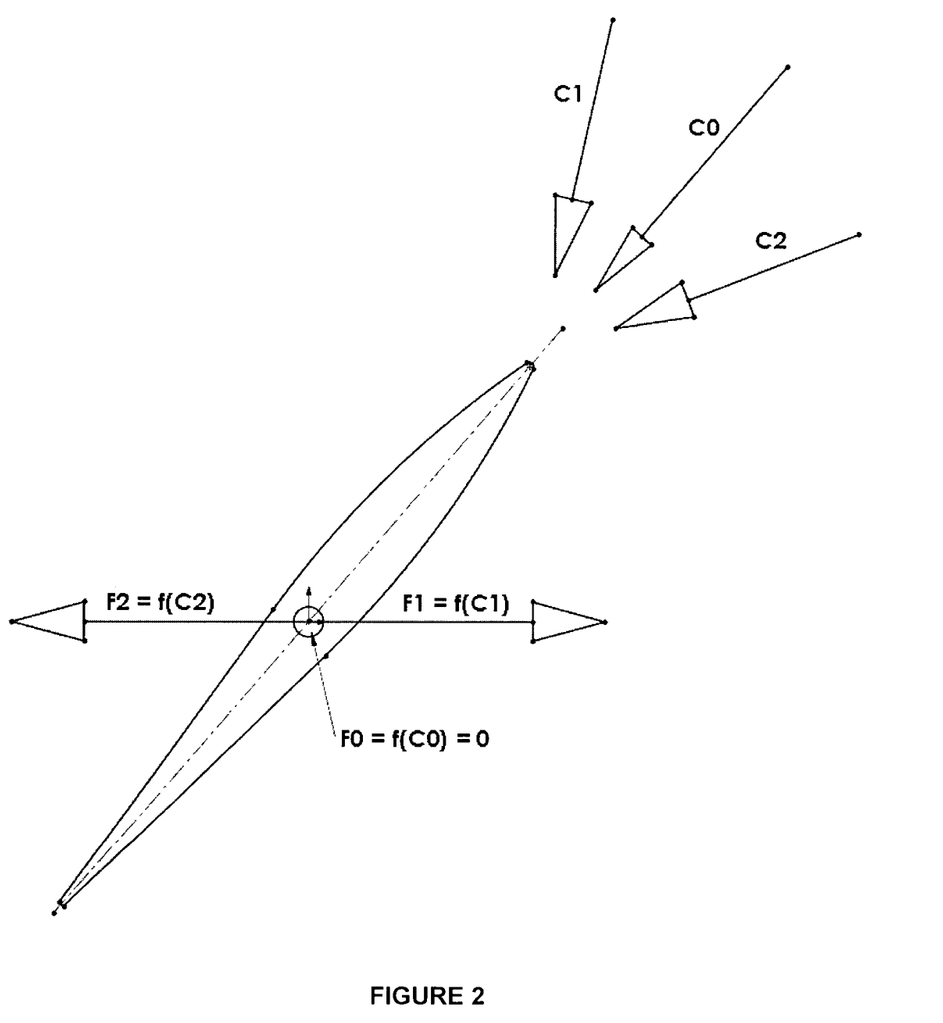
FIG. 2 illustrates a graph of the velocity vectors at the zone of interest in a rotating frame of reference (observer associated with the sub-runner)
Figure 3:
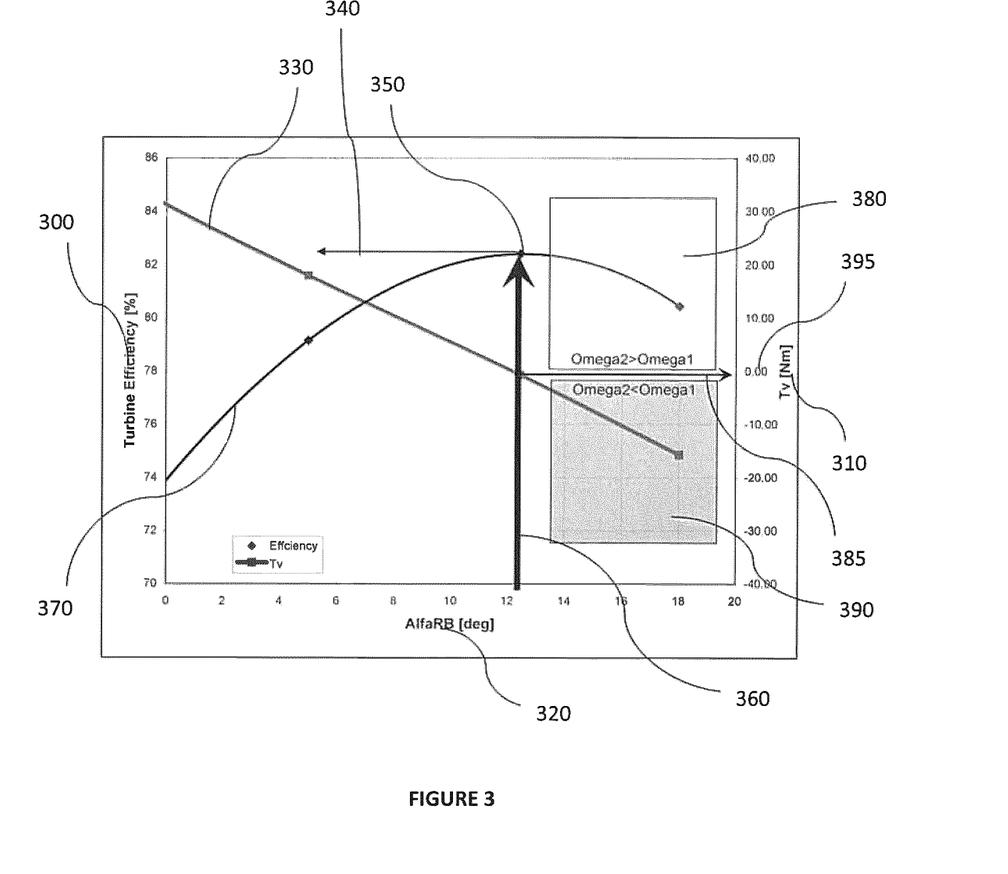
FIG. 3 illustrates a graph of the turbine efficiency and sub-runner torque dependence on the main runner blade position.

As depicted in FIG. 2, velocity vectors are represented at the zone of interest in a frame of reference rotating with speed ω about the Z axis. At vector $C_0$, best efficiency point is represented, when the force acting upon the sub-runner blade is 0 F0. At vector $C_1$, there is too small of a blade opening creating a partial load, and force acting on the blade greater than 0 F1. At vector $C_2$, there is too large of a blade opening creating an overload, and force acting upon the sub-runner blade less than 0 F2. $C_0$ represents the flow velocity vector corresponding to the best efficiency point, $C_1$ represents the flow velocity vector corresponding to the part load operation, and $C_2$ represents the flow velocity vector corresponding to the overload operation As depicted in FIG. 3, the relationship between the turbine efficiency 300 as measure in percent efficiency (%), and sub-runner torque Tv 310 as measured in Newton meters (Nm), is illustrated based on their dependence on the main runner blade position AlfaRB 320 as measured in degrees (deg). If the rotational speed of the main runner Omega1 (ω1) is less than the rotational speed of the sub-runner Omega2 (ω2), the sub-runner torque will be positive as illustrated in the sub-runner positive torque zone 380. If the rotational speed of the main runner Omega1 is more than the rotational speed of the sub-runner Omega2, the sub-runner torque will be negative as illustrated in the sub-runner negative torque zone 390. A sub-runner torque vector 385 is drawn from the point where a sub-runner torque line 330 intersects with the main runner blade position vector 360, which is drawn from the main runner blade position to the turbine efficiency curve 370. A turbine efficiency vector 340 is also extrapolated toward the turbine efficiency percentage from the point at which the main runner blade position vector intersects with the turbine efficiency curve. The results of these measurements confirm that the most efficient turbine operating point 350 on the turbine efficiency curve, at the main runner blade position as defined by the main runner position vector, corresponds to a sub-runner torque of 0 Nm 395. This relationship may be used to inform the turbine sub-runner automatic regulation, adjustment and control of the main runner blade position.

Figure 4:
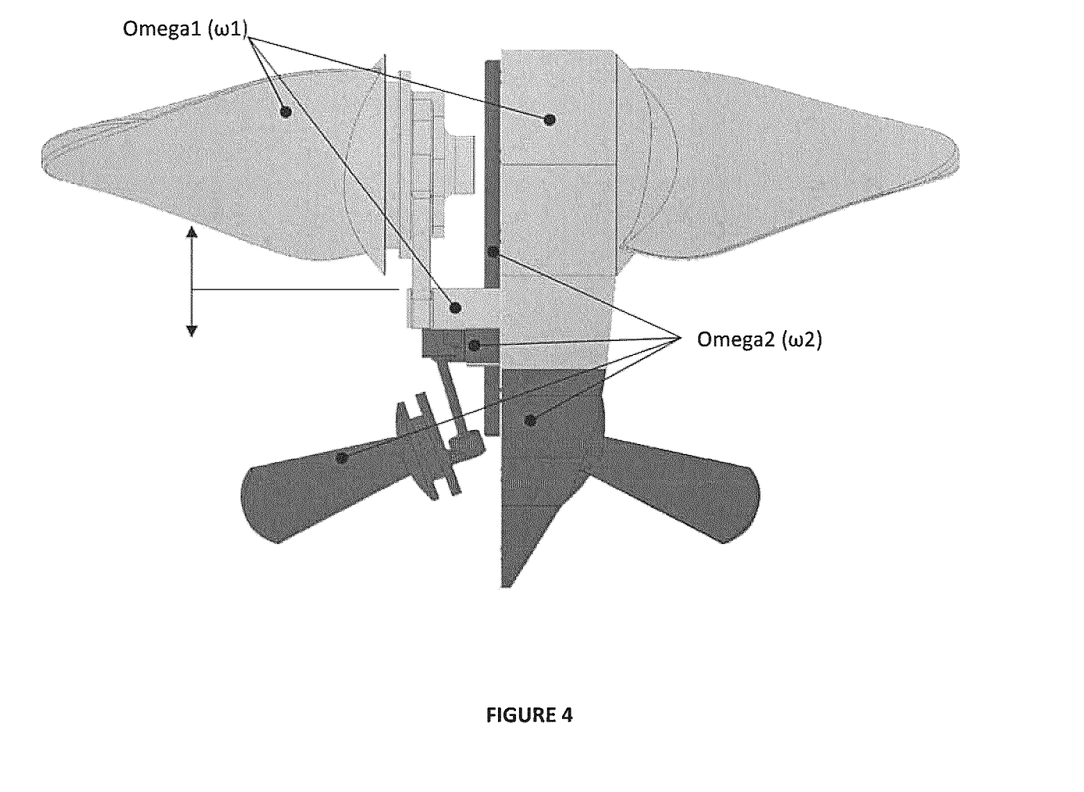
FIG. 4 illustrates the whole assembly of the sub-runner control mechanism.

In one embodiment as depicted in FIG. 4, there are two sets of components which rotate either with speed Omega1 100 or Omega2 110. The main runner hub, main runner blades, main runner cross head rotate with speed Omega1. The sub-runner shaft (having a threaded section), sub-runner cross head, sub-runner hub, and sub-runner blades rotate with speed Omega2.

Figure 5:
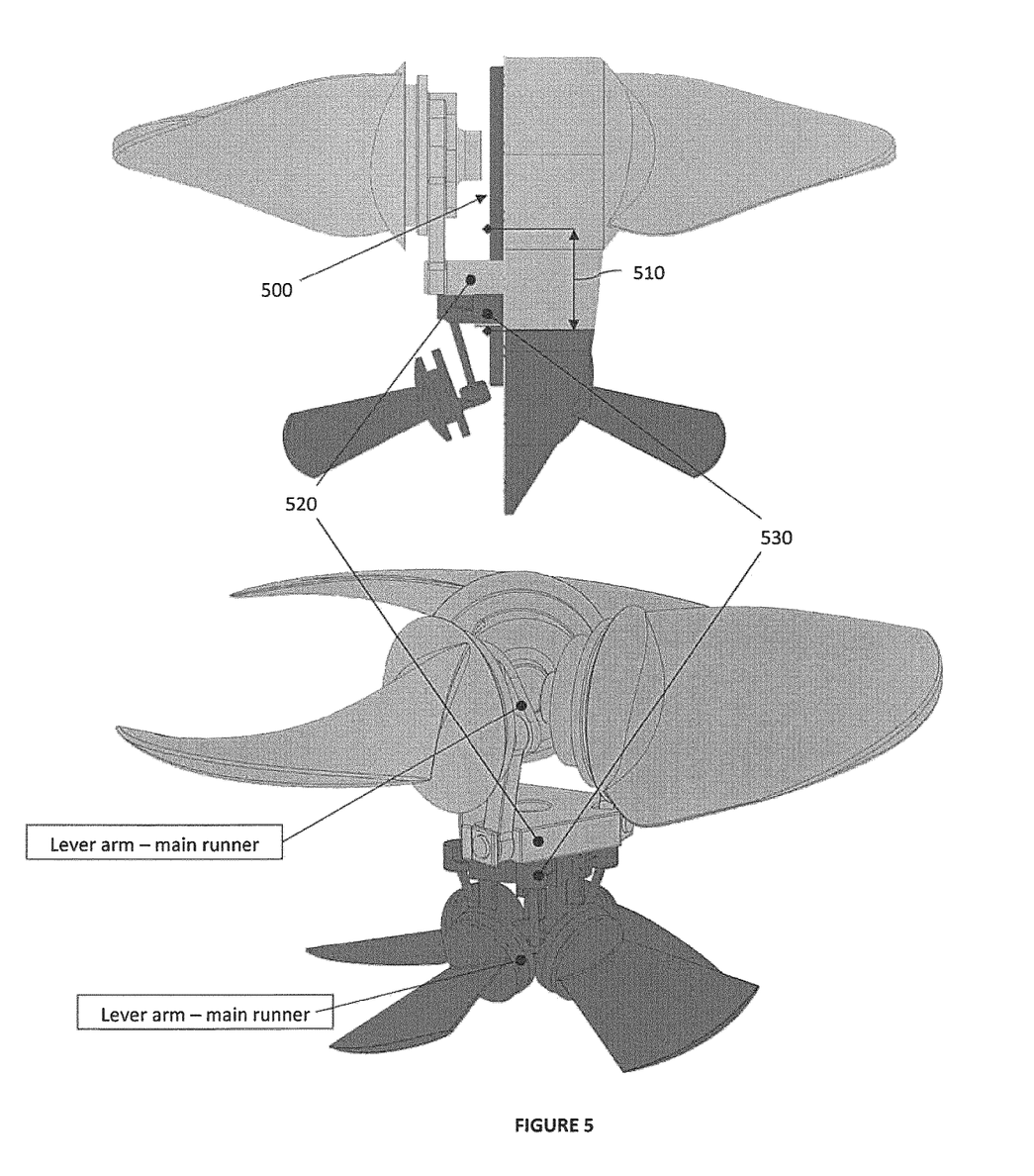
FIG. 5 illustrates how the sub-runner control mechanism alters the angle of the sub-runner blades.

In one embodiment as depicted in FIG. 5, there is a threaded interface 500 between the sub-runner shaft's threaded section 510 and the main runner cross head 520. This is the major interface that facilitates transferring of the relative rotation between the runners (Omega2–Omega1) to a linear movement of the main runner cross head causing the assembly of cross heads to move up or down thus changing angular positions of both blades (main runner blade and the sub-runner blade). Both cross-heads (main runner cross head and sub-runner cross head 530) are coupled via an axial-thrust bearing 540 thus allowing for same axial movement while maintaining ability of relative rotation with rotational speed equal to difference between Omega 1 (ω1) and Omega2 (ω2).

It will be appreciated that, although specific embodiments of the turbine sub-runner have been described herein for purposes of illustration, various modifications may be made without departing from the spirit and scope of the invention. In particular, it is within the scope of the turbine sub-runner to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the sub-runner.

Acts associated with the turbine sub-runner described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the turbine sub-runner described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, personal communication device, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the turbine sub-runner are examples and can be varied in many ways. Such present or future variations are not to be regarded as a departure from the spirit and scope of the turbine sub-runner, and all such modifications as would be obvious to one skilled in the art are intended to be included within the scope of the following claims.

The scope of the claims should not be limited by the preferred embodiments set forth in the examples, but should be given the broadest interpretation consistent with the description as a whole.

I claim:

1. A turbine sub-runner for location within the vortex zone of a turbine main runner, the turbine sub-runner comprising:
   a sub-runner shaft operatively connected to a sub-runner control mechanism;
   a sub-runner hub connected to the sub-runner shaft;
   at least two sub-runner blades connected to the sub-runner hub; and
   a sub-runner control mechanism, capable of transferring rotational energy of the sub-runner into angular movement of turbine main runner blades and the sub-runner blades, the sub-runner control mechanism comprising at least one threaded rod; at least one cross-head; and at least one lever arm and, wherein a threaded rod interface between the sub-runner shaft and a main runner cross-head, and an interface between the main runner cross-head and a sub-runner cross-head facilitates angular adjustment of the turbine main runner blades and the at least two sub-runner blades; and
   wherein the sub-runner is configured to be responsive to the relative flow of a vortex located downstream of a turbine main runner, created by the turbine main runner.

2. The turbine sub-runner of claim 1, wherein the at least two sub-runner blades are capable of angular adjustment or are fixed.

3. The turbine sub-runner of claim 1, wherein the turbine main runner blades are adjusted in combination with a secondary adjustment mechanism.

4. The turbine sub-runner of claim 1, wherein the at least one threaded rod rotates in response to the relative rotational velocity between the main runner and the sub-runner acting through the threaded rod interface upon the at least one cross-head, which changes linear position of the at least one cross-head and drives the at least one lever arm up or down, resulting in a change in the angular position of the turbine main-runner blades;

at least one cross-head of the main runner is coupled via axial bearings with at least one cross-head of the sub-runner, allowing for relative rotation between both cross-heads, and linear movement of both is the same; and the at least one cross-head of the sub-runner is connected kinematically with at least one lever arm of the at least two blades of the sub-runner, which imposes angular movement of the at least two sub-runner blades.

5. A self-regulated Kaplan or Deriaz type turbine encompassing:

a turbine power generator component;
a main runner comprising:
at least two main runner blades;
a main runner hub, connected to the at least two main runner blades and a main runner shaft;
the main runner shaft connected to the at least two main runner blades and to the turbine power generator component; and
the sub-runner of claim 1.

6. A kit to retrofit a Kaplan or Deriaz type turbine with a turbine sub-runner comprising:

a sub-runner shaft operatively connected to the sub-runner control mechanism;
a sub-runner hub connected to the sub-runner shaft;
at least two sub-runner blades connected to the sub-runner hub; and
the sub-runner control mechanism, capable of transferring the rotational energy of the sub-runner into angular movement of main runner blades of a turbine and the sub-runner blades;
the sub-runner control mechanism comprising at least one threaded rod; at least one cross-head; and at least one lever arm and, wherein a threaded rod interface between the sub-runner shaft and a main runner cross-head, and an interface between the main runner cross-head and a sub-runner cross-head facilitates angular adjustment of the turbine main runner blades and the at least two sub-runner blades; and
wherein the sub-runner is configured to be responsive to the relative flow of the vortex located downstream of a turbine main runner, created by the turbine main runner.

* * * * *

UNITED STATES PATENT AND TRADEMARK OFFICE
CERTIFICATE OF CORRECTION

PATENT NO. : 11,421,644 B2
APPLICATION NO. : 16/487943
DATED : August 23, 2022
INVENTOR(S) : Jacek Swiderski It is certified that error appears in the above-identified patent and that said Letters Patent is hereby corrected as shown below:

In the Claims

Column 10, Line 65, Claim 4, delete "to the" and insert -- to --

Column 12, Line 7, Claim 6, delete "hub; and" and insert -- hub; --

Signed and Sealed this
Twenty-fifth Day of October, 2022

*Katherine Kelly Vidal*

Katherine Kelly Vidal
*Director of the United States Patent and Trademark Office*